(12) United States Patent
Stolpestad et al.

(10) Patent No.: US 11,603,323 B2
(45) Date of Patent: Mar. 14, 2023

(54) METHOD AND SYSTEM FOR PRODUCING FRESH WATER USING A REVERSE OSMOSIS MEMBRANE SYSTEM

(71) Applicants: Tor M. Stolpestad, Søgne (NO); Rolf Birger Bendiksen, Horten (NO)

(72) Inventors: Tor M. Stolpestad, Søgne (NO); Rolf Birger Bendiksen, Horten (NO)

( * ) Notice: Subject to any disclaimer, the term of this patent is extended or adjusted under 35 U.S.C. 154(b) by 262 days.

(21) Appl. No.: 16/978,058

(22) PCT Filed: Mar. 6, 2019

(86) PCT No.: PCT/NO2019/050049
§ 371 (c)(1),
(2) Date: Sep. 3, 2020

(87) PCT Pub. No.: WO2019/172775
PCT Pub. Date: Sep. 12, 2019

(65) Prior Publication Data
US 2020/0407242 A1    Dec. 31, 2020

(30) Foreign Application Priority Data
Mar. 6, 2018 (NO) .................................... 20180328

(51) Int. Cl.
*C02F 1/44* (2006.01)
*B01D 61/02* (2006.01)
(Continued)

(52) U.S. Cl.
CPC ............ *C02F 1/441* (2013.01); *B01D 61/025* (2013.01); *B01D 61/10* (2013.01); *C02F 1/465* (2013.01);
(Continued)

(58) Field of Classification Search
CPC .... B01D 2311/2661; B01D 2311/2684; B01D 2313/24; B01D 2313/26; B01D 2313/90;
(Continued)

(56) References Cited

U.S. PATENT DOCUMENTS 5,944,999 A    8/1999  Chancellor et al.
6,187,202 B1 *  2/2001  Fish ....................... B01D 61/10
                                                210/170.07
(Continued)

FOREIGN PATENT DOCUMENTS

| GB | 2068774  A  | 8/1981 |
| WO | 99/06323  A | 2/1992 |
| WO | 00/64567  A1 | 4/2000 |

OTHER PUBLICATIONS

IR Office Action in Application No. 139950140003005013 dated Sep. 2, 2020.
(Continued)

*Primary Examiner* — Terry K Cecil
(74) *Attorney, Agent, or Firm* — Maschoff Brennan

(57) ABSTRACT

This publication relates to a method and a system for producing freshwater through a reverse osmosis process in a submerged membrane system requiring a differential pressure over the membrane system. The differential pressure is provided by introducing gas bubbles in the riser device (2) downstream the outlet (7) for fresh water in the riser device (2). The system comprises at least one submerged, reverse osmosis unit (1), with an inlet (4) for water and an outlet (7) for fresh water, a riser device (2) extending from the outlet (7) of the submerged membrane system to at, above or below sea level and a system for providing a low pressure side for the reverse osmosis process.

18 Claims, 4 Drawing Sheets

(51) Int. Cl.
*B01D 61/10* (2006.01)
*C02F 1/465* (2006.01)
*C02F 103/08* (2006.01)

(52) U.S. Cl.
CPC ...... *B01D 2313/24* (2013.01); *B01D 2313/26* (2013.01); *B01D 2313/90* (2013.01); *C02F 2103/08* (2013.01); *C02F 2201/46175* (2013.01); *C02F 2301/06* (2013.01)

(58) Field of Classification Search
CPC .. B01D 2315/06; B01D 61/025; B01D 61/10; C02F 1/441; C02F 1/461; C02F 1/465; C02F 2103/08; C02F 2201/46175; C02F 2209/03; C02F 2301/06; C02F 2303/10; C25B 15/083; C25B 1/044; C25B 1/50; Y02A 20/131; Y02E 60/36; Y02W 10/30
See application file for complete search history.

(56) References Cited

U.S. PATENT DOCUMENTS

| | | | |
|---|---|---|---|
| 9,617,172 | B1 | 4/2017 | Baski |
| 11,174,877 | B2* | 11/2021 | Bergstrom ............... F04F 1/08 |
| 2007/0221576 | A1 | 9/2007 | Parkinson |
| 2008/0017558 | A1 | 1/2008 | Pollock et al. |
| 2011/0084031 | A1 | 4/2011 | Van Vliet et al. |

OTHER PUBLICATIONS

MA Office Action in Application No. 50772 dated Dec. 25, 2020.
DZ Office Action in Application No. DZ/P/2020/000443 dated Aug. 30, 2020.
Pacent, P. et al., "Submarine seawater reverse osmosis desalination system" In: Desalination 126 (Nov. 1999) 213-218.

* cited by examiner

METHOD AND SYSTEM FOR PRODUCING FRESH WATER USING A REVERSE OSMOSIS MEMBRANE SYSTEM

TECHNICAL FIELD OF THE INVENTION

The invention relates to a method and a system for producing freshwater using a reverse osmosis process in a submerged membrane system requiring a differential pressure over the membrane system. The system comprises at least one submerged, reverse osmosis unit with an inlet for water and an outlet for freshwater, a riser device extending from the outlet of the submerged membrane system to at, above or below sea level and a system for providing a low pressure side for the reverse osmosis process.

BACKGROUND OF THE INVENTION

It is a well-established fact that freshwater resources are limited in many areas of the world. It is also well known that freshwater has been produced from seawater by means of submerged semipermeable reverse osmosis membrane system. This process requires a high pressure to be exerted on the high concentration side of the membrane, lower pressure for fresh and brackish water than of the seawater, and which has a natural osmosis pressure to be overcome. A system of reverse osmosis does not only desalts or cleans the water, but also removes bacteria, pyrogens, organics, particles, colloids and other unwanted substances in the water.

It has been proposed to submerge one or more stacks comprising a number of reverse osmosis membranes into a deep fjord or offshore, in order to exploit the hydrostatic pressure at such depths as driving force for the reverse osmosis process. U.S. Pat. No. 9,617,172 discloses a desalination system that includes a membrane system submerged in the ocean at a depth selected to provide a hydrostatic pressure and a high pressure side for generating reverse osmosis to produce freshwater from seawater. The desalination system also includes a pumping system arranged above sea level, the pumping system being in fluid communication with the membrane system configured to pump the freshwater to the surface and to provide a low pressure side for reverse osmosis. The system also includes a system for transporting the freshwater to land and storage system for storage of freshwater at land. A desalination method is also disclosed, the method includes the following steps: providing a plurality of reverse osmosis membrane discs at a depth in an ocean selected to provide a hydrostatic pressure; directing seawater through the membrane discs using the hydrostatic pressure; collecting the freshwater directed through the membrane disc; pumping the freshwater to surface of the ocean; and then transporting the freshwater to land.

WO 99/06323 describes a method and a plant for seawater desalination which is to be located below the seawater level, intended to exploit the hydrostatic pressure that builds up at an at least 250 meters depth on one side of a semipermeable filter membrane, in order to overcome the osmotic pressure which is characteristic of salt water itself, whereas the other side of the membrane is kept at atmospheric pressure. Pumping operations are only reduced to those relating to the fresh water obtained from the filtration.

The process of first supplying low pressure at the reversed osmosis process and thereafter transport purified water to sea level is a high energy consumption process. There is an enormous potential to reduce energy consumption for submerged reverse osmosis for producing freshwater. The necessity of reducing pressure at permeate side of the process in order to overcome the osmosis pressure, thereby being able to produce freshwater over the system, requires energy, and is done by for example pumps providing the low-pressure side of the reverse osmosis process and is an example of potential possibility for reducing energy. Further, transfer of the produced freshwater to sea level, and further to the consumers, is according to prior art, made through energy consuming pumps and is another potential for reducing energy consumption.

SUMMARY OF THE INVENTION

In the following throughout the specification, the following terms means:

The term "inlet" refers to where the water to be purified, which may be seawater, brackish water or other contaminated water, enters the membrane system.

The term "outlet" refers to where the produced fresh water over the membrane system enters at the permeate side of the membrane system.

The term fresh water refers to produced potable and/or drinking water.

The present invention is based on utilization of reverse osmosis in order to produce potable and/or drinking water from seawater, brackish water and other contaminated water using a submerged membrane unit system. A desired pressure reduction has to take place at permeate side of the reverse osmosis unit by affecting the static weight of the water column that brings the produced water to sea level where on the opposite side a high pressure due to water pressure of the submerged membrane unit is provided.

An object of the invention is to provide low pressure at the outlet side of the reverse osmosis process unit in order to create the necessary pressure difference across the reverse osmosis unit required to overcome the osmotic pressure in order to be able to initiate and further run the reverse osmotic process.

Another object of the invention is to provide a system for transporting produced fresh water from a submerged reverse osmosis system to a receiving unit at, above, or below sea level surface.

Another object of the invention is to provide a system for transporting the brine, which may be a by-product of the reverse osmosis process, away from the system and at least a distance away from the intake of seawater to be purified of the process.

Another object of the invention is to provide a system for separating the transporting agents from the purified water at, above or below sea level.

Yet another object of the invention is to gain sufficient meters above sea level in order to be able to further transport the purified water by means of gravitation or difference in altitude to either shore/mainland or a tanker and similar.

The objects are achieved by a method as further defined by the independent claims, while embodiments, alternatives, modifications and variants are defined by the depended claims.

In a first aspect, the present invention relates to a method and a system for producing freshwater using a reverse osmosis process in a submerged membrane system requiring a differential pressure across the membrane system. The system comprises at least one submerged, reverse osmosis unit with an inlet for water and an outlet for freshwater, a riser device extending from the outlet of the submerged membrane system to at, above or below sea level and a system for providing a low pressure side for the reverse osmosis process. The differential pressure is provided by introducing gas bubbles in the riser device downstream of the outlet for fresh water in the riser device, thereby reducing the weight of the water column and also the hydrostatic pressure at the outlet of the reversed osmosis unit.

The riser device being arranged in a vertical position or at least upwards inclining position, allowing the gas bubbles to ascend upwards, diluting the water inside the riser device with gas and gas bubbles and reducing the weight and static pressure and thereby providing an upwards motion or flow of the fresh water inside the riser device.

The gas bubbles introduced may be supplied from a flow of compressed gas supplied from the sea level through a supply line.

Alternatively, gas may be produced by electrolysis of water in the riser, where electrodes are being arranged in the outlet region of the reverse osmosis unit or at a distance downstream the referenced reversed osmosis unit.

The gas bubbles may be produced by means of at least two electrodes spaced apart, where at least one of the at least two electrodes used may possibly be the riser, and where the electrodes are induced with electrical current and/or applied with a pulsed electrical signal to ignite an electrical arc across the electrodes in order to produce oxyhydrogen rich gas from the water inside the riser generating bubbles rising and expanding due to decreasing external pressure in an upwards flow, lifting produced water to the top end of the riser. The bubbles ascending in an upwards flow, reducing the weight of the water column in the riser, and thereby reducing the pressure at the outlet. The electric current preferably generated from an electrical power supply.

The gas bubbles, which may be bubbles of gas, vapour and other substances, together with the purified water ascended to extraction in a tank or a separator above sea level, at sea level or at a subsurface level for use in different applications. The purified water is distributed to consumer and gases are distributed to further processing, recycling, and storage or to the environments when released from produced purified water when entering a tank or a separator above sea level, at sea level or at a subsurface level.

The compressed gas supplied from the sea level enters the riser device with an amount and a pressure giving a pressure difference across the reverse osmosis (RO) unit making the static weight of the water column inside the riser small enough in order to give a differential pressure across the RO unit equal or higher than the required pressure to overcome osmotic pressure.

The electrical current is induced at a level where the generated bubbles decreases the pressure in the riser downstream from point of bubble generating, sufficiently in order to give a pressure difference across the RO unit equal to or higher than the required pressure to overcome osmotic pressure.

A by-product of the reverse osmosis process, which may be brine or other contaminated water, is transported away from the submerged, reverse osmosis unit by use of an upright second riser device extending from the brine outlet where gas bubbles are introduced in the riser device as described above in order to provide an upward flow.

The riser device, which may extend from the submerged membrane system to at, above or below sea level, may also extend above sea level at an elevation high enough for utilization of gravitation/difference in altitude in order to transport purified water to shore or a tanker or the like.

In a second aspect, the present invention relates to a system for providing differential pressure for a reverse osmosis process producing freshwater in a submerged membrane system comprising at least one submerged, reverse osmosis unit with an inlet for water and an outlet for fresh water, a riser device extending from the outlet of the submerged membrane system to at, above or below sea level and a system for providing a low pressure side for the reverse osmosis process. The system for providing the low pressure side comprises an arrangement for introducing gas bubbles into a riser device downstream the outlet for freshwater from a reverse osmosis unit.

The riser device may be in fluid communication with a separator at, above or below sea level separating gas and freshwater arrived from the riser device.

Preferably the arrangement for introducing gas bubbles into the riser device is either of a nozzle for introducing a flow of compressed gas from the surface, for example supplied from a compressor, into the riser device, an arrangement of at least two electrodes closely spaced, where one of the at least two electrodes used can be the riser device, in connection with an electrical power supply for producing oxyhydrogen rich gas or an arrangement for electrolysis.

The arrangement for introducing gas bubbles into the riser device may be arranged in at least two levels in the riser device. Where the levels are dispersed from downstream the outlet of the submerged membrane system towards the sea level. The bubbles may be introduced at selected levels in the riser device, being introduced simultaneously at the at least two levels. Alternatively, the bubbles may be introduced stepwise, starting from the level closest to the sea level, and subsequently introducing the bubbles level by level, or at selected levels, towards the level closest to the outlet for fresh water of the submerged membrane system. The bubbles being introduced may continue being produced at the selected levels in the riser device and each of the at least two levels in the riser device may be activated or deactivated for controlling the production of freshwater. An advantage of arranging multiple points for introducing gas bubbles on the riser device, at a number of levels along the riser device, starting the initiating of introducing bubbles the level closest to sea level and subsequently introducing level by level towards the outlet for freshwater of the submerged membrane system, is that less energy or lower pressure is needed at starting up the process of producing the freshwater. The closer from the sea level, the lower is the pressure, the lower is the weight of the water column to overcome, and thereby a lower energy or lower pressure is needed for initiating introducing the bubbles in the riser device closer to sea level. Consequently, the bubbles will displace the water in the riser device and the weight of the water column will be reduced above the level or levels where the bubbles are introduced, thus the stepwise introducing of gas bubbles towards the outlet for freshwater of the submerged membrane system will require lower energy or lower pressure for the introduction of the gas bubbles. According to the present invention, a reverse osmosis membrane system is utilizing a system for fluid transportation for providing a low pressure side for the reverse osmosis process. The system is lifting freshwater from a submerged reverse osmosis system through a riser device extending from the submerged membrane system to at, above or below sea level. The system comprises an arrangement for introducing gas bubbles into the riser at or in the region of the outlet of freshwater from the reverse osmosis unit and a separator at, above or below sea level separating gas and freshwater arrived from the riser device.

According to the present invention, a reverse osmosis membrane system is using the hydrostatic pressure at a given sea depth as feed pressure, combined with a reduced hydrostatic pressure at the permeate side and thereby providing a pressure difference across the membrane exceeding the osmotic pressure and is used in order to be able to initiate and produce fresh water over the system. The freshwater produced has sufficiently low salinity and/or low content of humus to be classified as potable and/or drinking water. Low pressure is provided by generating bubbles at the permeate side of the process, either through injection of compressed gas, through oxyhydrogen rich gas produced by two or more electrodes applied or induced with electrical current where a pulsed electrical signal may be used to ignite an electrical arc or by gas produced by electrolysis of water, thereby reducing the weight of water inside the riser and consequently also the pressure at the outlet of the reverse osmosis membrane system. The bubbles also functions as a gas lift by reducing the effective density of the fluid in the riser, jetting, and thereby transporting the water from the riser to at, above or below sea level. The jetting appears when bubbles introduced ascend upwards, and as they ascend upwards their volumes expands correspondingly.

Further, a natural osmosis process has to overcome the osmotic pressure in order to commence the process of reverse osmosis, which is given by the invention through a high pressure side at the inlet of the membrane system and a lower pressure at the outlet of the membrane system, also defined as the permeate side of the membrane system. The high pressure side is given by the ambient pressure of the submerged reverse osmosis unit, but the low pressure side has to be generated. As earlier described gas bubbles are introduced in order to transport the fresh water produced from the reverse osmosis system, the gas bubbles is also introduced in order to generate the low pressure side of the reverse osmotic process. The bubbles displace the water column inside the riser, reducing the internal static pressure, which in turn generates the differential pressure across the membrane(s). The static pressure at feed water side rises with increased sea depth, thereby increasing the potential for generating differential pressure. The bubbles may be introduced with an adjustable amount in order to maintain and lower the pressure further than that required for the reverse osmosis in order to adjust the production rate over the system.

The gas bubbles are introduced with or produced in such amount or rate that required pressure for initiating reverse osmosis process is obtained and thereafter regulated to required production rate. Production rate is increasing with increased pressure difference over the membrane system. Sensors and valves may automatically regulate the production and the rate of gas bubbles introduced. A control system based on measurements of the sensors, which may be pressure and temperature sensors, may send signals for automatic regulation. If the pressure at the permeate side generates a pressure difference over the system critically for example for the collapse of the membrane, it will also regulate down the production and the rate of bubbles. The critical area of collapse is membrane specific and the control system will in any cases, based on the measurements of the pressure and temperature sensors, be adjusted to project specific values.

The gas bubbles are introduced into the riser device at the outlet of the membrane system. The introduced gas displaces the fresh water inside the riser exponentially while ascending and thereby reduces the static pressure on the permeate side of the reverse osmosis membrane.

The submerged reverse osmosis system may be of a modular design by functional partitioning into scalable, reusable modules. This makes the system flexible instead of rigid, fulfilling different project requirements, and makes it possible to easily scale the system up or down in order to meet each individual project's need of capacity due to both required volume of produced fresh water and present sea depth for each project. The modular building blocks will comprise wide use of components "off the shelf" in order to keep the costs low and the availability high.

BRIEF DESCRIPTION OF THE DRAWINGS

Embodiments and examples of the method and system according to the invention shall be explained in more detail in the following description, referring to the Figures, wherein.

DETAILED DESCRIPTION OF EMBODIMENTS DISCLOSED IN THE DRAWINGS

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of producing freshwater from seawater, brackish water or contaminated water. However, the embodiments to be discussed next are not limited to such type of water only. Moreover, reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
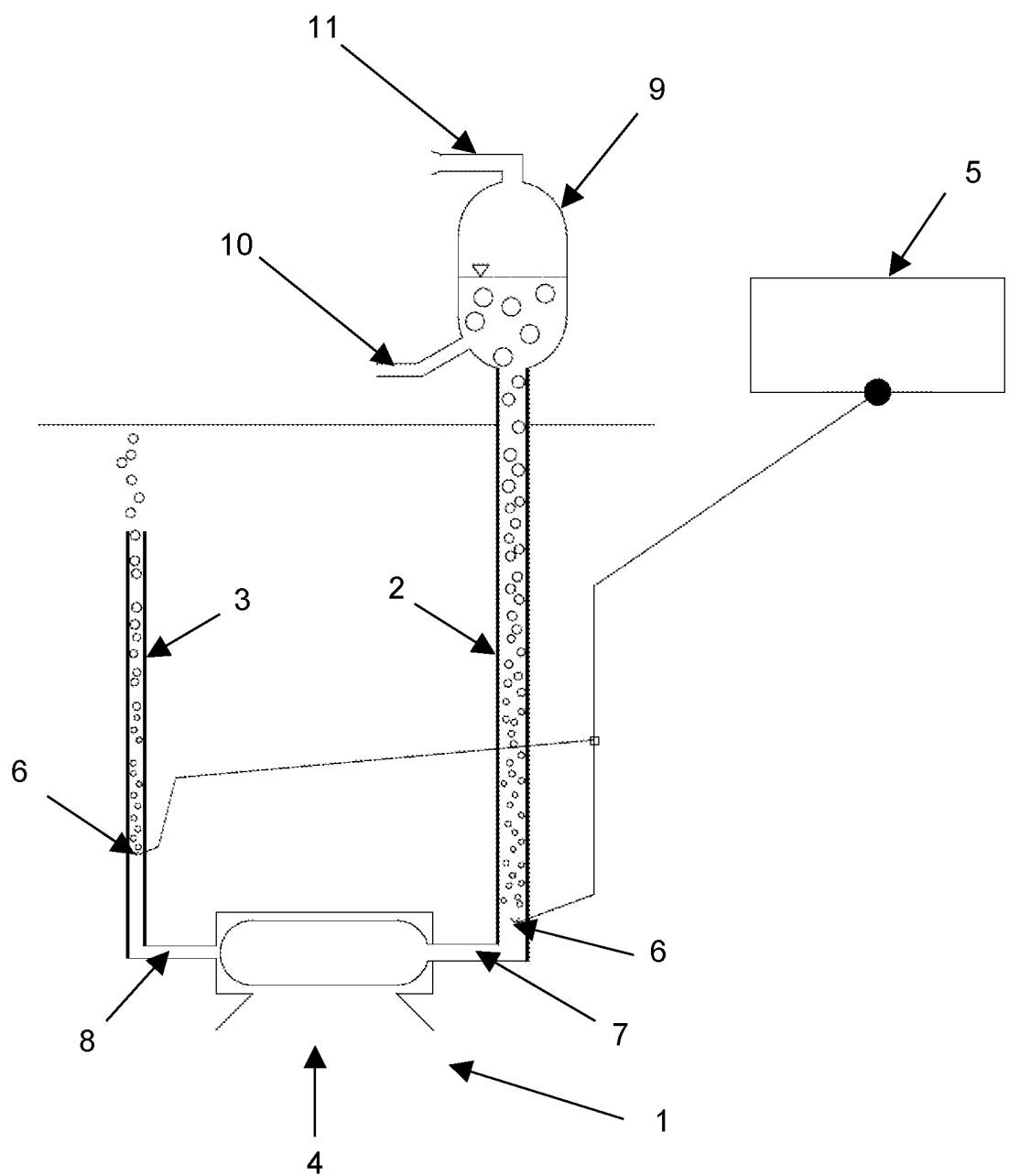
FIG. 1 shows schematically a view of the submerged membrane system where bubbles and low pressure side of the reverse osmosis process and bubbles at the brine outlet of the reverse osmosis process are generated by means of a gas supply reducing static pressure on the permeate side.

FIG. 1 shows schematically a view of the submerged membrane system with bubbles at the low pressure side of the reverse osmosis process and bubbles at the brine outlet 8 of the reverse osmosis process are generated by means of gas supply, that may be a supply of compressed gas, reducing static pressure on the permeate side. The illustration shows a submerged reverse osmosis unit 1, with a sea water inlet 4, where sea water is entering the membrane system, due to a pressure difference over the reverse osmosis unit 1 appearing from high pressure at sea water inlet 4, according to sea depth and low pressure at the permeate side at the outlet of purified water 7 according to low pressure appearing from the generated bubbles. The brine being a by-product of the process is transported through the brine (and contaminated water) outlet 8. Compressed air is supplied from a compressor 5, arranged at the surface, through an injection nozzle 6 at the riser device for purified water 2 and the riser device for brine 3 at a distance above the reverse osmosis unit 1. Bubbles are generated from injection nozzle 6 point and ascend upwards in the riser devices 2, 3 and simultaneously expanding as ascending, creating gas lift jetting the water upwards and thereby transporting the purified water in the purified water riser device 2 towards the surface and also transporting the brine through the brine riser device 3. The purified water enters a separator 9 or tank separating purified water through an outlet for purified water 10 at the lower side of the separator 9 or tank and the gas from the bubbles through a gas outlet 11 at the upper side of the separator 9 or tank. The brine enters the seawater at a distance away from the submerged reverse osmosis unit 1 in order to not increase the solution of salinity at the vicinity of the sea water inlet 4. FIG. 1 shows one point/level from where bubbles are generated from the injection nozzle 6, but it is not restricted to this point/level only; points/levels from where bubbles are generated from the injection nozzle 6 may be arranged with injections nozzles 6 and distributed along the whole length of the riser device 2, from the outlet 7 to the sea level. Bubbles may be generated from the injection nozzles 6 one at a time, simultaneously or at selected points/levels.

Figure 2:
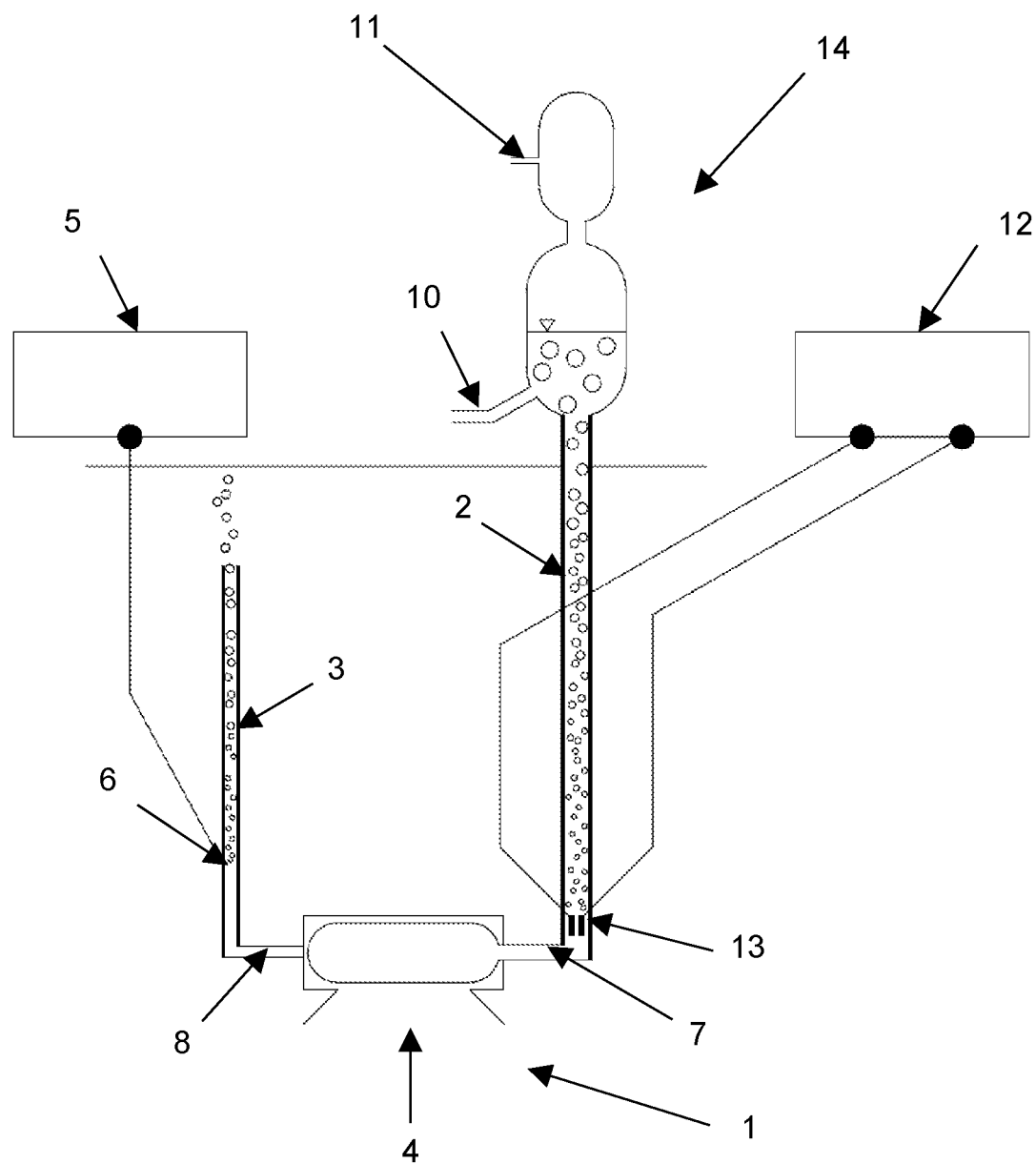
FIG. 2 shows schematically a view of the submerged membrane system where bubbles at the low pressure side of the reverse osmosis process are generated by means of electrodes. Bubbles at the brine outlet of the reverse osmosis process are generated by means of gas supply creating a gas-lift effect to circulate seawater through the feed side of the membrane.

FIG. 2 shows schematically a view of the submerged membrane system unit where bubbles at the low pressure side of the reverse osmosis process unit are generated by means of electrodes. The feed water circulation through the reverse osmosis unit is powered by bubbles created by means of injected pressurized gas and/or use of electrical induced current on one or more electrodes placed in the brine riser.

FIG. 2 shows a submerged reverse osmosis unit 1, with a sea water inlet 4, where sea water is entering the membrane system due to a pressure difference over the reverse osmosis unit 1 appearing from high pressure at sea water inlet 4, according to sea depth and lower pressure at the permeate side according to low pressure appearing from the generated bubbles. The bubbles are generated by means of electrodes 13 closely spaced apart and applied with electrically induced current on electrodes from the electric power supply 12, igniting an arc across the electrodes and thereby producing oxyhydrogen rich gas resulting from the arc and/or induced electrical current reacting with the water components in the riser. The oxyhydrogen rich gas is appearing as bubbles of $O_2$ and $H_2$ in the riser device for purified water 2 and is transporting the water to sea level and also providing the reverse osmosis process with low pressure at the permeate side at the outlet of purified water 7 of the reverse osmosis unit as described above. Purified water enters above sea level, at sea level or a subsurface level in a separator 14 or tank separating purified water through an outlet 10 for purified water at sea level at the lower part of the separator 14 or tank and the hydrogen and oxygen from the bubbles through a gas outlet 11 for $H_2$ and $O_2$ at sea level, above sea level or at subsurface level at the upper side of the separator 14 or tank and are distributed to further processing, storage or to the environments when arriving a gas/water separator 14 above sea level, at sea level or at a subsurface level. FIG. 2 shows one point/level from where bubbles are generated by means of electrodes 13, but it is not restricted to this point/level only; points/levels from where bubbles are generated by means of electrodes 13 may be arranged with electrodes 13 and distributed along the whole length of the riser device 2, from the outlet 7 to the sea level. Bubbles may be generated from the electrodes 13 one at a time, simultaneously or at selected points/levels.

The brine which is a by-product of the process, is transported through the brine (and contaminated water) outlet 8. The compressed gas is supplied from a compressor 5 through an injection nozzle 6 at the riser device for brine 3 at a distance above the reverse osmosis unit 1. Bubbles are generated from injection nozzle 6 point and arises upwards the riser device 3 and simultaneously expanding as arising creating gas lift jetting the water upwards and thereby transporting the brine through the riser device 3 for brine. The brine enters the seawater at a distance from the submerged reverse osmosis unit 1 in order to not increase the salinity at the sea water inlet 4. FIG. 2 shows that bubbles generated in the riser device for brine 3 are generated by means of injection nozzles, but it is not restricted to injection nozzles 6, it may also be generated by means of electrodes as described for the riser device 2. FIG. 2 shows one point/level from where the bubbles are generated in the riser device for brine 3, but it is not restricted to this point/level only; points/levels from where the bubbles are generated by means of injection nozzles 6 may be arranged along the whole length of the riser device for brine 3.

FIG. 2 shows that bubbles generated in the riser device for brine 3 are generated by means of injection nozzles 6, but it is not restricted to injection nozzles 6, it may also be generated by means of electrodes as described for the riser device 2 in FIG. 2.

To summarize, the main principle of the invention as shown in FIGS. 1 and 2 is that gas is introduced either by means of a compressor or pre-compressed gas or by means of an electric power source to the riser. Gas injected into or produced in riser ascends in the riser as bubbles. This pushes water upwards in the riser towards the surface. The push increases as gas expands due to decreasing surrounding water pressure. The pressure is smaller inside the riser compared to outside seawater pressure due to mixture gas and water inside the riser. These two effects in combination create a pressure difference across the membranes, enabling the membranes to produce fresh water. The fresh water is flowing out of the system, jetting up the riser. Gas injection or gas production in the riser makes this a continuous process.

Figure 3:
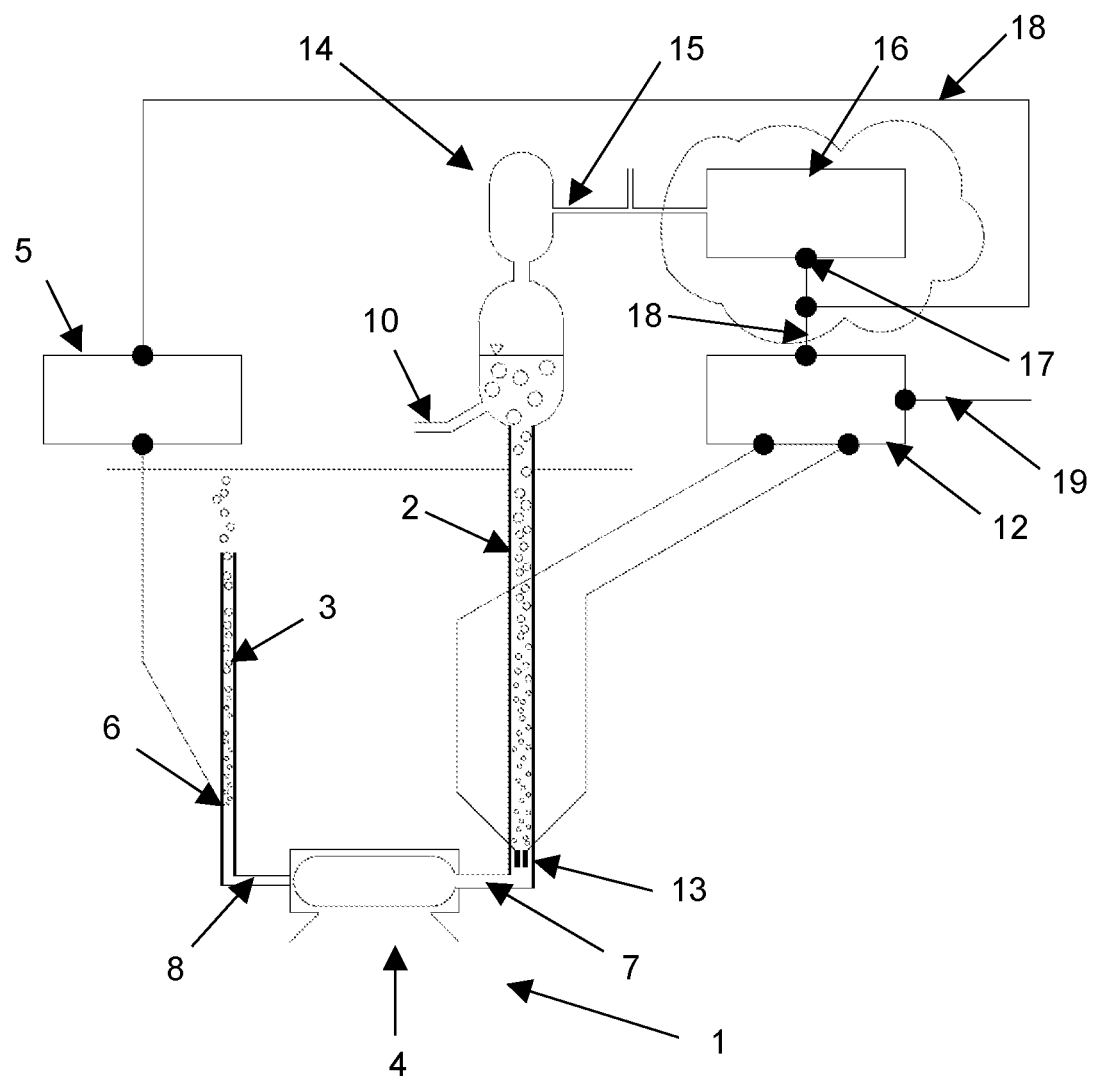
FIG. 3 shows schematically an embodiment of how to utilize the gas evolved at, above and below sea level first generated in the process, shown in FIG. 2, in order to lift fresh water to sea level.

FIG. 3 shows schematically an example embodiment of how to utilize the gas first generated in the process of lifting fresh water to sea level, as shown in FIG. 2, and in the end evolved at sea level. Gas separated from fresh water in the separator 14 is further distributed through gas outlet 15 for $O_2$ for $O_2$ at sea level to a system for conversion of gas to electric power 16. The system for conversion of gas to electric and/or mechanical power 16 can comprise gas turbines, steam generators, combustion motor driven generators and the like for utilization of gas to produce electrical power. The produced electrical or mechanical power can be distributed back to power consuming parts of the system, such as the compressor 5 or the electric power supply 12 or further distributed to consumers outside of the system.

In FIG. 1 through 3, the sea water inlet 4 is shown to be below the reverse osmosis unit 1, but it is not restricted to be in that position, it might be placed on the side of the system, at the top of the system or at any appropriate position.

Further, the outlet of purified water 7 and the brine outlet 8 are shown to be at the side of the reverse osmosis unit 1, but they are not restricted to be in that position, they might be placed at the top of the system, below the system or any other appropriate position.

The introduction of the bubbles is shown at a point where the riser device 2 is pointing in a vertical position as shown in FIGS. 1-3, it is not restricted to that vertical position, the bubbles may be introduced in any position where the riser devise 2 has an upwards angle allowing the bubbles to arise in an upward stream.

The separator 9,14 or tank is shown to be above sea surface level, but it is not restricted to that position, it may be placed either above, below or at sea surface level. It may be beneficial to place the separator 9, 14 as high over the sea surface as possible in order to utilize the force of gravity for transporting water to shore through pipelines.

Figure 4:
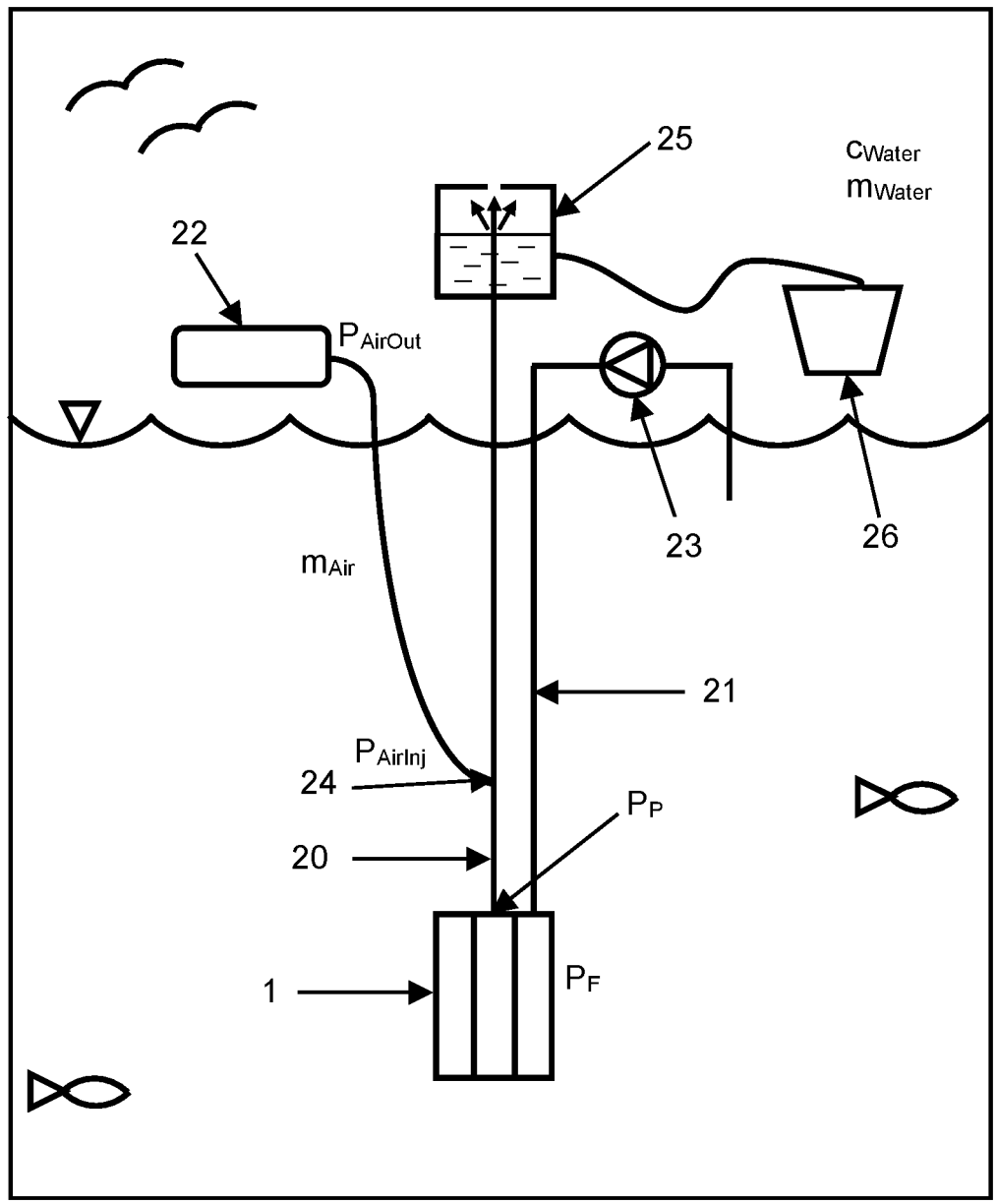
FIG. 4 shows schematically an illustration of a concept test layout carried out under observation from SINTEF. The Figures and values stated do not correlate to any limitation within this patent application.

An initial test of the method has been carried out. A reverse osmosis unit (Toray: TM820V-400) was attached to a sea water feed hose and a fresh water production riser connected to the low pressure side of the reverse osmosis module, as illustrated in FIG. 4. The submerged system was suspended from a surface vessel. The reverse osmosis unit was submerged to a sea depth of 390 meter. The depth of the reverse osmosis unit beneath the boat was verified both by the surface vessel sonar and by measurement indications on the riser hose. The compressed air intake on the riser was chosen to be 50 meter above the reverse osmosis unit, so that gas is introduced into the production riser at a sea depth of 340 meter. Both feed and production hose where 1 inch in diameter with an inner diameter of approximately 23 mm.

During the test, seawater was taken from the surface and pumped down to the reverse osmosis unit using a pressure of 2.8 bar to ensure stable flow velocity along the feed side of the reverse osmosis unit. The sea water flow rate was estimated to be in the range of 50 litres per minute based on pump specific curves from vendor. The seawater feed pressure is mainly needed to overcome resistance in couplings, pipes, hoses, etc. The pressure drop along the feed side (from feed to retentate) of the reverse osmosis membrane is equal to the water pressure at a depth of 390 meter (approximately 40 bara).

Pressurized air was supplied from a battery of gas bottles equipped with a pressure reducing control valve to control the airflow rate. The pressure ($P_{AirOut}$[bara]) was measured via manometers located both before and after the pressure reducing control valve. The airflow rate ($m_{Air}$ [STD litre/min]) was measured and adjusted using a mass flow controller unit. An additional pressure manometer was located downstream of the mass flow controller unit, before the entrance to the 350 meter long pressurized air supply line indicated in FIG. 4.

The production rate of water ($m_{Water}$ [liter/min]) was measured by the time to fill 25 litre cans which collected water leaving the riser at the vessel deck (located approximately 2 metres above sea level). The salinity level of the seawater and produced water was sampled for off-line laboratory analysis. Conductivity measurements of the produced water was analysed using a portable conductivity analyser (Kemotron) during production.

When the test started, the riser was filled with seawater. At the start of the test compressed air was injected into the riser at the injection point located at 340 m sea depth (see FIG. 4). During start-up, the sea water is partly replaced by the air flowing into the riser. As the void fraction of air increases in the riser the hydrostatic pressure is reduced at the permeate side of the membrane ($P_P$). The reverse osmosis unit will start producing fresh water when the pressure difference across the membrane ($P_F$–$P_P$) exceeds the osmotic pressure difference. Once the production of fresh water has started the sea water in the riser will gradually be replaced by fresh water and a reduction in salinity of the produced water can be observed.

During the initial injection of compressed air into a water filled riser the production start-up with gas lift jetting water from the riser into the air/water separator, and further outbursts, reaching out several metres up in to the air in decreasing pulses. The water production reached a steady state production rate of approximately three litres per minute (4.3 m$^3$/day).

Samples of produced water were collected during the test, for off-line analysis. In addition, conductivity to the produced water was measured during testing using a portable conductivity analysis device. Both conductivity and salinity decreased to a value well below the limit for drinking water (<2.5 mS/cm).

The reverse osmosis process requires a certain pressure difference over the membrane system in order to commence the reverse osmosis process and continuously produce freshwater. In the literature, the required pressure difference varies. Common knowledge is that required pressure difference for overcoming the osmotic pressure is around 27 bar. In the experiment carried out with SINTEF, the required pressure difference was given to be 23.7 bar, and depth of the membrane unit to be submerged was chosen to 390 meter to give 40 bar at the water inlet of the membrane unit. Further the introduction of gas bubbles was placed at 340 meters, 50 meters above the membrane unit in order to achieve the required low pressure at the permeate side of membrane and thereby the 23.7 bar difference over the membrane unit. WO99/06323 operates at a sea depth of 250 meter to achieve required osmotic pressure to overcome for the membrane system used. Continuous improvements and developments of the membrane technology give membranes with increasingly improved properties and also lower and lower required pressure difference over the membrane in order to initiate and have a continuous osmotic process. The main principles is to have a higher pressure at inlet of water to be purified through the membrane than the pressure at the outlet, permeate side, of purified water in order to achieve the membrane specific required pressure difference. A minimum pressure difference required of the prevailing membrane system used, due to membrane specification, gives a minimum depth of placing the membrane system. The maximum depth of placing the membrane system is a question of cost-benefit calculation of the specific project. Distance to power supply or compressor, diameter of riser, size of membrane unit, temperature of water, source water cleanliness, maintenance, etc. are factors that play a substantial role due to costs.

The depth of placing the reverse osmosis unit (1) described in this invention is beneficial at a depth between 40-1500 meters, it is more beneficial at a depth between 200-1000 meters, and most beneficial at a depth between 350 and 800 meters. Even though it is beneficial for depths up to 1500 meters, it is not limited to 1500 meters, only investments costs are restricting. The introduction of bubbles must find place at a distance sufficient for generating required low pressure side in order to have the required pressure difference to overcome the osmotic pressure needed for the osmotic process to commence. To have a continuously production of fresh water, the low pressure side must generate a lower differential pressure over the system than needed to overcome the osmotic pressure. By adjusting the flow of pressurized gas at the low pressure side, the production rate may be regulated to a desirable level.

TABLE 1

| Component | Description |
| --- | --- |
| 1 | Reverse osmosis unit |
| 2 | Riser device for purified water |
| 3 | Riser device for brine |
| 4 | Sea water inlet |
| 5 | Compressor |
| 6 | Injection nozzle |
| 7 | Outlet purified water |
| 8 | Brine outlet (and contaminated water) |
| 9 | Separator |
| 10 | Outlet purified water at sea level |
| 11 | Gas outlet |
| 12 | Electric power supply |
| 13 | Electrode |
| 14 | Separator |
| 15 | Gas outlet |
| 16 | System for conversion of gas to electric power |
| 17 | Output of electric power |
| 18 | Distribution of electric power back to system |
| 19 | Distribution of electric power to other processes or systems |
| 20 | Fresh water production riser |
| 21 | Sea water feed hose |
| 22 | Gas bottle |
| 23 | Pump |
| 24 | Compressed air intake |
| 25 | Tank |
| 26 | Can |

The invention claimed is:

1. A method for producing freshwater comprising:
producing fresh water in a reverse osmosis process in a submerged membrane system requiring a differential pressure over the membrane system and that includes (i) at least one submerged, reverse osmosis unit, with an inlet for water and an outlet for fresh water, (ii) a riser device extending from the outlet of the submerged reverse osmosis unit to at, above or below sea level, and (iii) a system for providing a low pressure side for the reverse osmosis process; and
providing the differential pressure by introducing gas bubbles in the riser device downstream of the outlet for fresh water,
wherein introducing the gas bubbles into the riser device is performed in at least two levels in the riser device dispersed from downstream the outlet of the submerged reverse osmosis unit towards the sea level, wherein the gas bubbles are introduced at selected levels in the riser device being introduced simultaneously in the at least two levels, or being introduced stepwise, and the bubbles are subsequently introduced level by level or at selected levels towards a top end of the riser device.

2. The method according to claim 1, further comprising arranging the riser device in a vertical position or at least in upwards inclined position.

3. The method according to claim 2, wherein introducing the gas bubbles comprises supplying a flow of compressed gas from the sea level through a supply line.

4. The method according to claim 2, wherein introducing the gas bubbles is performed by electrolysis of water.

5. The method according to claim 1, wherein introducing the gas bubbles comprises supplying a flow of compressed gas from sea level through a supply line.

6. The method according to claim 5, wherein compressed gas supplied from the sea level enters the riser device with an amount giving a differential pressure across the reverse osmosis unit, equal or higher than the required pressure to overcome osmotic pressure.

7. The method according to claim 1, wherein introducing the gas bubbles is performed by electrolysis of water.

8. The method according to claim 7, wherein the electrolysis is performed using at least two electrodes, closely spaced apart, wherein:
the electrodes are induced with electrical current in connection with an electrical power supply for producing oxyhydrogen rich gas from the water inside the riser device, generating bubbles ascending in an upwards flow, reducing the weight of a water column in the riser device and thereby reducing the pressure at the outlet and also lifting produced water to the top end of the riser.

9. The method according to claim 8, wherein the electrical power supply applies a pulsed electrical signal to ignite an arc across the electrodes in order to produce oxyhydrogen rich gas.

10. The method according to claim 8, further comprising inducing the electrical current at a level, wherein the generated bubbles decrease the pressure in the riser device downstream from point of bubble generating, giving a pressure difference across the reverse osmosis unit equal or higher than the required pressure to overcome osmotic pressure.

11. The method according to claim 1, wherein the gas bubbles, which are bubbles of gas and vapor, together with a purified water are ascended to extraction in a tank or a separator above sea level, at sea level or at a subsurface level for use in different applications.

12. The method according to claim 1, wherein a purified water is distributed to consumer and gases are distributed to further processing, recycling, and storage or to an environment when released from produced purified water when entering a tank or a separator above sea level, at sea level or at a subsurface level.

13. The method according to claim 1, wherein a by-product of the reverse osmosis process, which may be brine or other contaminated water, is transported away from the submerged, reverse osmosis unit by use of an upright second riser device extending from a brine outlet where gas bubbles are introduced in the second riser device in order to provide an upward flow.

14. The method according to claim 1, wherein the riser device is extending at, above or below sea level at an elevation high enough for utilization of gravitation/difference in altitude in order to transport purified water to shore or a vessel.

15. A system for providing differential pressure for a reverse osmosis process producing freshwater in a submerged membrane system comprising:
at least one submerged, reverse osmosis unit with an inlet for water and an outlet for fresh water,
a riser device extending from the outlet of the submerged reverse osmosis unit to at, above or below sea level, and
a system for providing a low pressure side for the reverse osmosis process, including an arrangement for introducing gas bubbles into the riser device downstream the outlet for freshwater from a reverse osmosis unit,
wherein the arrangement for introducing gas bubbles into the riser device is arranged in at least two levels in the riser device dispersed from downstream the outlet of the submerged reverse osmosis unit towards the sea level, and the bubbles are introduced at selected levels in the riser device being introduced simultaneously at the at least two levels, or being introduced stepwise, and the bubbles are subsequently introduced level by level or at selected levels towards a top end of the riser device.

16. The system according to claim 15, wherein the riser device is in fluid communication with a separator at, above or below sea level separating gas and freshwater arrived from the riser device.

17. The system according to claim 15, wherein the arrangement for introducing gas bubbles into the riser device is (i) a nozzle for introducing a flow of compressed gas supplied from the surface into the riser device, or (ii) an arrangement of at least two electrodes, closely spaced, in connection with an electrical power supply for producing oxyhydrogen rich gas, or (iii) an arrangement for electrolysis.

18. The system according to claim 15, wherein:

the bubbles being introduced continue being produced at the selected levels in the riser device and/or each of the at least two levels in the riser device can be activated or deactivated for controlling the production of freshwater.

* * * * *